(12) United States Patent
Ohtomo et al.

(10) Patent No.: US 7,804,996 B2
(45) Date of Patent: Sep. 28, 2010

(54) METHOD FOR ASSOCIATING STEREO IMAGE AND THREE-DIMENSIONAL DATA PREPARATION SYSTEM

(75) Inventors: Fumio Ohtomo, Itabashi-ku (JP); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 743 days.

(21) Appl. No.: 11/114,728

(22) Filed: Apr. 26, 2005

(65) Prior Publication Data

US 2005/0286760 A1    Dec. 29, 2005

(30) Foreign Application Priority Data

Jun. 23, 2004   (JP)   ............... 2004-184692

(51) Int. Cl.
  *G06K 9/00*   (2006.01)
  *G06T 15/00*  (2006.01)
(52) U.S. Cl. .................... 382/154; 345/419
(58) Field of Classification Search .......... 382/154, 382/103, 278, 107; 348/207.1; 345/419
  See application file for complete search history.

(56) References Cited

U.S. PATENT DOCUMENTS

| | | | | |
|---|---|---|---|---|
| 4,654,872 A * | 3/1987 | Hisano et al. | ................ | 382/154 |
| 4,858,157 A * | 8/1989 | Murai et al. | ................ | 382/154 |
| 5,262,856 A * | 11/1993 | Lippman et al. | ....... | 375/240.12 |
| 5,274,453 A * | 12/1993 | Maeda | ........................ | 348/584 |
| 5,530,420 A * | 6/1996 | Tsuchiya et al. | ............ | 340/435 |
| 5,684,887 A * | 11/1997 | Lee et al. | ..................... | 382/107 |
| 6,031,568 A * | 2/2000 | Wakitani | ..................... | 348/169 |
| 6,385,334 B1 * | 5/2002 | Saneyoshi et al. | ........... | 382/154 |
| 6,690,451 B1 * | 2/2004 | Schubert | .................... | 356/3.14 |
| 7,050,909 B2 * | 5/2006 | Nichols et al. | ............. | 701/301 |
| 7,242,817 B2 * | 7/2007 | Takeda et al. | ................ | 382/278 |
| 2002/0001406 A1 * | 1/2002 | Kochi et al. | .................. | 382/154 |
| 2002/0180636 A1 | 12/2002 | Lin et al. | ............... | 342/357.14 |
| 2002/0180870 A1 * | 12/2002 | Chen | ....................... | 348/207.1 |
| 2002/0191837 A1 * | 12/2002 | Takeda et al. | ................ | 382/154 |

(Continued)

FOREIGN PATENT DOCUMENTS

EP           1 139 062        10/2001

(Continued)

*Primary Examiner*—Daniel G Mariam
*Assistant Examiner*—Aklilu k Woldemariam
(74) *Attorney, Agent, or Firm*—Nields, Lemack & Frame, LLC (57) ABSTRACT

A method for associating a stereo image, by acquiring images of an object from a first point and a second point and by associating the image at the first point and the second point, comprising a step of moving from the first point to the second point while taking an image of the object, a step of setting two or more pass points on the image of the first point, a step of comparing a preceding image and a subsequent image over time, a step of retrieving and identifying the pass points of the preceding image in the subsequent image, a step of retrieving and identifying the pass points sequentially with respect to every frame image data from the image of the first point to the image of the second point, a step of identifying the pass points of the image of the second point, and a step of associating the image at the first point with the image at the second point via the pass points.

15 Claims, 5 Drawing Sheets

U.S. PATENT DOCUMENTS

| | | | |
|---|---|---|---|
| 2004/0105493 A1* | 6/2004 | Kondo et al. | 375/240.08 |
| 2004/0105579 A1 | 6/2004 | Ishii et al. | 382/154 |
| 2004/0125984 A1* | 7/2004 | Ito et al. | 382/103 |

FOREIGN PATENT DOCUMENTS

| | | |
|---|---|---|
| EP | 1 158 309 | 11/2001 |
| EP | 1 378 790 | 1/2004 |
| WO | 02/082181 | 10/2002 |
| WO | 2004/004320 | 1/2004 |
| WO | 2004/084136 | 9/2004 |

* cited by examiner

METHOD FOR ASSOCIATING STEREO IMAGE AND THREE-DIMENSIONAL DATA PREPARATION SYSTEM

BACKGROUND OF THE INVENTION

The present invention relates to a method for associating a plurality of images when 3-dimensional measurement is performed by using a stereo image in photogrammetry (photographic surveying). The present invention also relates to a 3-dimensional data preparation system for preparing a 3-dimensional data from a plurality of images.

A stereo image is an image, which represents an image of an object in stereoscopic manner. The stereo image comprises a plurality of images taken on a same object from different image-taking directions. In the plurality of images, corresponding points on each of the images must be associated with each other. By associating in such manner, it is possible to obtain 3-dimensional data of an arbitrary point in the image.

In order to have a stereo image, from which 3-dimensional data can be obtained, matching (stereo-matching) between the images must be carried out. Therefore, for the images to be used in the photogrammetry, it is necessary to have an image, in which stereo-matching can be performed, and there must be a condition between the images, in which stereo-matching can be performed.

In order to perform the stereo-matching, parameters must be determined for each of images such as a position of a camera to take images, image magnification factor of the image, tilting (a horizontal angle $\omega$ of an optical axis of the camera, a vertical angle $\phi$ of the optical axis of the camera, and a twisting angle r around the optical axis of the camera). When these parameters are processed only based on the information from the images (digital image), 6 or more points are required, which indicate the same point in a plurality of images (this is called a control point or a pass point).

When a stereo image is prepared, by adding to each images the data of position of the camera and the data of azimuth when each image is taken, it is possible to convert an arbitrary point in the image from a coordinate system of the image to a coordinate system on the ground, i.e. 3-dimensional measurement can be performed.

A plurality of images, which constitute a stereo image, are the images, which are taken on the same object from different image-taking directions. In order to obtain 3-dimensional data, it is desirable that image-taking conditions are kept in constant state even when the image-taking direction is changed to facilitate stereo-matching. However, it is difficult to take image by maintaining height of a camera or tilting of an optical axis of the camera in constant state when the images are taken manually, and it requires a large-scale system.

Figure 8:
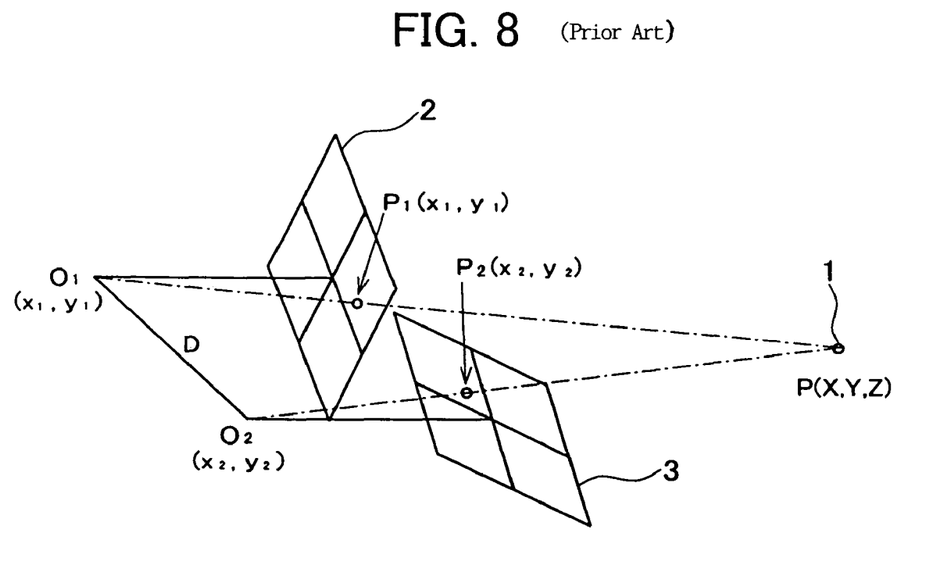
FIG. 8 is a drawing to explain a condition of two images when an image of an object is taken at two points.

When images are taken manually from a first point O1 to a second point O2 with a distance D between these points, magnification factor of the images and the image-taking posture are normally different in each case. As shown in FIG. 8, images 2 and 3 taken of an object 1 are different from each other in image magnification factor, tilting (a horizontal angle $\omega$ of an optical axis of a camera, a vertical angle $\phi$ of the optical axis of the camera, and a twisting angle r with the optical axis of the camera as the center). In such case, in order to perform stereo-matching between the images 2 and 3, pass points must be manually selected with high accuracy on each of the images. Further, because image-taking conditions are different from each other, selection and matching of the pass point P of the images 2 and 3 requires long time and high skill.

SUMMARY OF THE INVENTION

It is an object of the present invention to provide a method and a system, by which it is possible to easily perform matching of pass points between a plurality of images and to improve efficiency of stereo-matching and to automate the stereo-matching.

To attain the above object, the present invention provides a method for associating a stereo image, by acquiring images of an object from a first point and a second point and by associating the image at the first point with the image at the second point, comprising a step of moving from the first point to the second point while taking an image of the object, a step of setting two or more pass points, a step of comparing a preceding image and a subsequent image over time, a step of retrieving and identifying the pass points of the preceding image in the subsequent image, a step of retrieving and identifying the pass points sequentially with respect to every frame image data from the image of the first point to the image of the second point, a step of identifying the pass points of the image of the second point, and a step of associating the image at the first point with the image at the second point via the pass points. Also, the present invention provides the method as described above, comprising a step of taking images of two or more objects moving relatively while moving, a step of identifying one of images taken on a same object as an image at a first point, a step of identifying an image at a point separated from the first point due to moving as an image at a second point, a step of setting two or more pass points on the image at the first point, a step of comparing a preceding image and a subsequent image over time, a step of retrieving and identifying the pass points of the preceding image in the subsequent image, a step of retrieving and identifying the pass points sequentially with respect to every frame image data from the image at the first point to the image at the second point, a step of identifying the pass points of the image at the second point, and a step of associating the image at the first point with the image at the second point via the pass points. Further, the present invention provides the method as described above, wherein images of the objects are continuously taken during movement. Also, the present invention provides the method as described above, wherein images of the objects are taken at predetermined time interval during movement. Further, the present invention provides the method as described above, wherein the image at the first point and the image at the second point are taken in high resolution, and images are taken in low resolution during the movement from the first point to the second point. Also, the present invention provides the method as described above, further comprising a step of retrieving pass points of the preceding image based on the pass points of the subsequent image over time.

Also, the present invention provides a 3-dimensional data preparation system, which comprises an image pickup device for taking images of an object while moving from a first point to a second point, a GPS unit for detecting positional coordinates of the image pickup device, an azimuth sensor for detecting an image-taking direction of the image pickup device, and a control arithmetic operation unit for processing the images taken by the image pickup device, wherein the control arithmetic operation unit sets up two or more pass points on the image at the first point, compares a preceding image and a subsequent image overtime, retrieves and identifies the pass points of the preceding image in the subsequent image, retrieves and identifies the pass points sequentially with respect to every frame image data from the image at the first point to the image at the second point, associates the image at the first point with the image at the second point via the pass points, and calculates 3-dimensional data of the object based on data of coordinate position of the image pickup device detected by the GPS unit and based on data of image-taking direction of the image pickup device detected by the azimuth sensor. Further, the present invention provides the 3-dimensional data preparation system as described above, wherein an image pickup device for taking images of two or more objects moving relatively while moving, a GPS unit for detecting position coordinates of the image pickup device, an azimuth sensor for detecting an image-taking direction of the image pickup device, and a control arithmetic operation unit for processing images taken by the image pickup device, wherein the control arithmetic operation unit defines one of the images taken on a same object as an image at a first point and defines an image at a point separate from the first point due to movement as an image at a second point, sets up two or more pass points on the image at the first point, compares the preceding image with the subsequent image over time, retrieves and identifies the pass points of the preceding image in the subsequent image, retrieves and identifies the pass points sequentially with respect to every frame image data from the image at the first point to the image at the second point, identifies the pass points of the image at the second point, associates the image at the first point with the image at the second point via the pass points, and calculates 3-dimensional data of the object based on data of coordinate position of the image pickup device detected by the GPS unit and base on data of image-taking direction of the image pickup device detected by the azimuth sensor. Also, the present invention provides the 3-dimensional data preparation system as described above, wherein the control arithmetic operation unit sets up a cross point obtained by edge processing of the image at the first point as a pass point. Further, the present invention provides the 3-dimensional data preparation system as described above, wherein the image pickup device can take an all-around image of the entire surroundings. Also, the present invention provides the 3-dimensional data preparation system as described above, wherein images are taken in high resolution at the first point and at the second point, and images are taken in low resolution during movement.

The method according to the present invention by acquiring images of an object from a first point and a second point and by associating the image at the first point with the image at the second point, comprising a step of moving from the first point to the second point while taking an image of the object, a step of setting two or more pass points on the image of the first point, a step of comparing a preceding image and a subsequent image over time, a step of retrieving and identifying the pass points of the preceding image in the subsequent image, a step of retrieving and identifying the pass points sequentially with respect to every frame image data from the image of the first point to the image of the second point, a step of identifying the pass points of the image of the second point, and a step of associating the image at the first point with the image at the second point via the pass points. As a result, the tracking of the pass points can be carried out through comparison of the images from the image at the first point to the image at the second point, and the stereo-matching can be automated.

The method according to the present invention comprises a step of taking images of two or more objects moving relatively while moving, a step of identifying one of images taken on a same object as an image at a first point, a step of identifying an image at a point separated from the first point due to moving as an image at a second point, a step of setting two or more pass points on the image at the first point, a step of comparing a preceding image and a subsequent image over time, a step of retrieving and identifying the pass points of the preceding image in the subsequent image, a step of retrieving and identifying the pass points sequentially with respect to every frame image from the image at the first point to the image at the second point, a step of identifying the pass points of the image at the second point, and a step of associating the image at the first point with the image at the second point via the pass points. Thus, the tracking of the pass points can be carried out through comparison of the images from the image at the first point to the image at the second point, and the stereo-matching can be automated.

According to the present invention, the image at the first point and the image at the second point are taken in high resolution, and images are taken in low resolution during the movement from the first point to the second point. This facilitates image processing during the tracking of the pass points, and this makes it possible to perform the processing at high speed.

According to the present invention, the method further comprises a step of retrieving pass points of the preceding image based on the pass points of the subsequent image over time. This contributes to the improvement of accuracy of the identifying the pass points.

The present invention provides a 3-dimensional data preparation system, which comprises an image pickup device for taking images of an object while moving from a first point to a second point, a GPS unit for detecting positional coordinates of the image pickup device, an azimuth sensor for detecting an image-taking direction of the image pickup device, and a control arithmetic operation unit for processing the images taken by the image pickup device, wherein the control arithmetic operation unit sets up two or more pass points on the image at the first point, compares a preceding image and a subsequent image over time, retrieves and identifies the pass points of the preceding image in the subsequent image, retrieves and identifies the pass points sequentially with respect to every frame image data from the image at the first point to the image at the second point, associates the image at the first point with the image at the second point via the pass points, and calculates 3-dimensional data of the object based on data of coordinate position of the image pickup device detected by the GPS unit and based on data of image-taking direction of the image pickup device detected by the azimuth sensor. As a result, by comparing images from the image at the first point to the image at the second point, the tracking of the pass points can be performed in easy manner and the stereo-matching can be automated. Also, the points of the image processed by the stereo-matching can be converted to the ground coordinate system, and it is possible to acquire 3-dimensional data of an arbitrary object in the image.

The present invention provides a 3-dimensional data preparation system, which comprises an image pickup device for taking images of two or more objects moving relatively while moving, a GPS unit for detecting position coordinates of the image pickup device, an azimuth sensor for detecting an image-taking direction of the image pickup device, and a control arithmetic operation unit for processing images taken by the image pickup device, wherein the control arithmetic operation unit defines one of the images taken on a same object as an image at a first-point and defines an image at a point separate from the first point due to movement as an image at a second point, sets up two or more pass points on the image at the first point, compares the preceding image with the subsequent image over time, retrieves and identifies the pass points of the preceding image in the subsequent image, retrieves and identifies the pass points sequentially with respect to every frame image data from the image at the first point to the image at the second point, identifies the pass points of the image at the second point, associates the image at the first point with the image at the second point via pass points, and calculates 3-dimensional data of the object based on data of coordinate position of the image pickup device detected by the GPS unit and based on data of image-taking direction of the image pickup device detected by the azimuth sensor. Therefore, by comparing the images from the image at the first point to the image at the second point, tracking of the pass points can be performed, and stereo-matching can be automated. Also, the points of the image processed by the stereo-matching can be converted to the ground coordinate system, and it is possible to acquire 3-dimensional data of an arbitrary object in the image.

BRIEF DESCRIPTION OF THE DRAWINGS

FIG. 4 is a view to show a condition of stereo-matching of a first image with a second image;

DETAILED DESCRIPTION OF THE PREFERRED EMBODIMENTS

Description will be given below on the best mode of the invention to carry out the present invention referring to the drawings.

Figure 1:
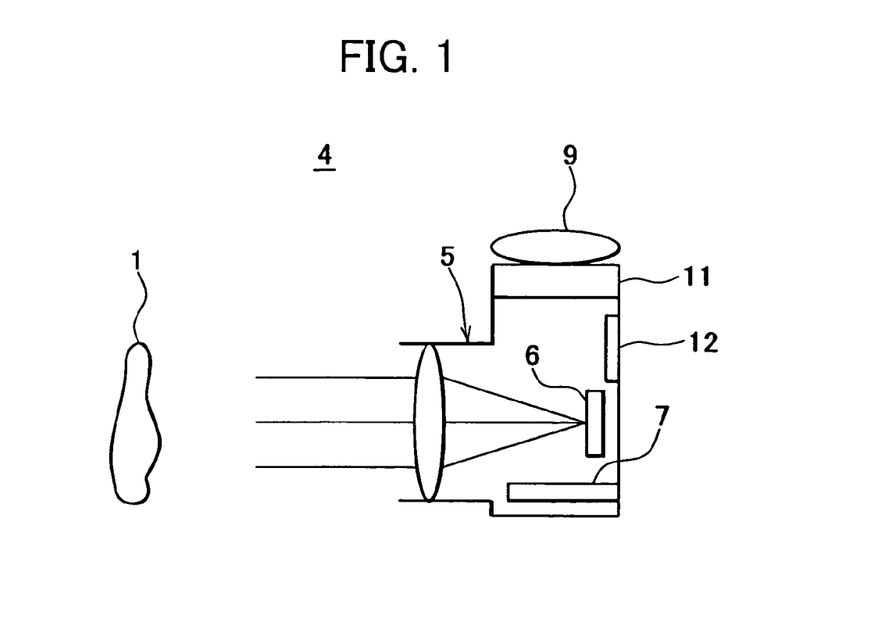
FIG. 1 is a schematical drawing of an embodiment of the present invention.
Figure 2:
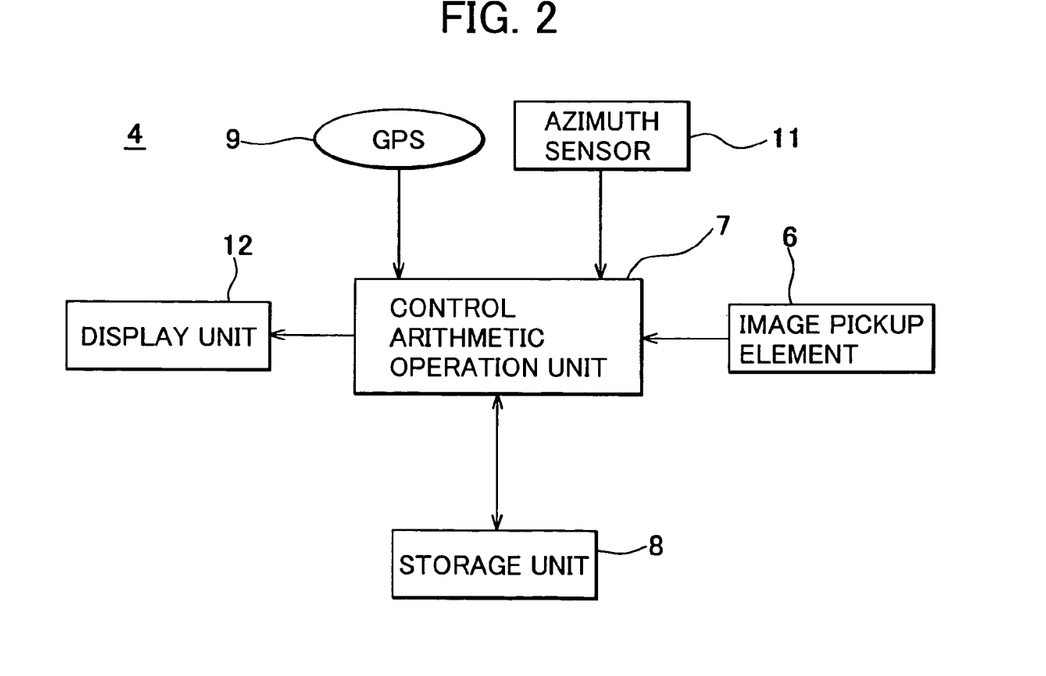
FIG. 2 is a schematical block diagram of the embodiment of the present invention.

Referring to FIG. 1 and FIG. 2, description will be given on a 3-dimensional data preparation system 4 according to the present invention.

In FIG. 1, reference numeral 5 denotes an image pickup device such as a digital camera, a digital video camera, etc., which can output a pickup image as a digital image signal. The image pickup device 5 comprises an image pickup element 6 such as a CCD, a CMOS sensor, etc., which is an accumulation of a multiple of pixels. The image pickup element 6 can identify address (position on the image pickup element) of each individual pixel.

An image of an object 1 taken by the image pickup device 5 is stored in a storage unit 8 as a digital image signal produced by the image pickup element 6 via a control arithmetic operation unit 7. As the storage unit 8, a semiconductor memory incorporated in the image pickup device 5, or a storage medium (e.g. a memory card) removable with respect to the image pickup device 5, or an external storage unit (e.g. FDD, MOD, CDD, DVD, HDD, etc.) removably mounted on the image pickup device 5 may be used.

To the image pickup device 5, a GPS unit 9 for measuring a position of the image pickup device 5, an azimuth sensor 11 for detecting an image-taking direction, a display unit 12, and the control arithmetic operation unit 7 are provided.

In the storage unit 8, various types of programs are stored. These programs include: an image processing program for performing image-processing, e.g. edge extract processing from an image (in particular, extraction of a corner portion or a cross point (pass point)) by Laplacian method, Sobel method, etc., an image processing program for performing processing such as identifying a pass point by retrieving a specific area as described later, a calculating program for calculating 3-dimensional data of an arbitrary point in the image in ground coordinate system based on a positional data obtained by the GPS unit 9 or based on an azimuth data obtained by the azimuth sensor 11. Also, the storage unit 8 comprises an image data storage area for storing the image data produced by the image pickup element 6 for each frame data or for each frame data at a predetermined time on time series, and also a surveying data storage area for storing the positional data of the GPS unit 9, the azimuth data of the azimuth sensor 11, and a 3-dimensional data thus calculated.

On the display unit 12, a pickup image or a surveying data, etc. are displayed.

Figure 5:
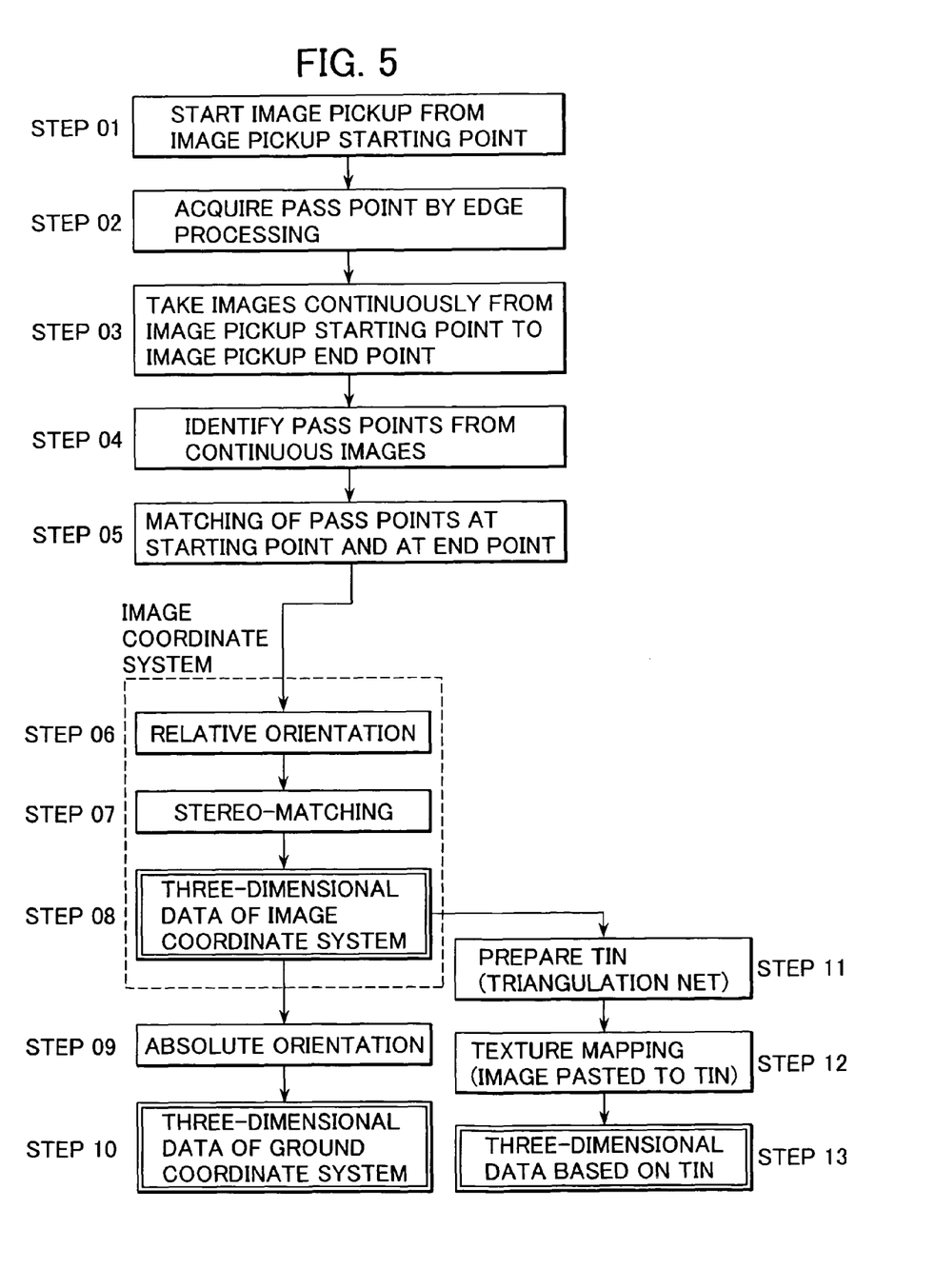
FIG. 5 is a flow chart to explain operation of the embodiment of the present invention.

In the following, description will be given on operation referring to FIG. 3 to FIG. 5.

Figures 3, 4A, 4B:
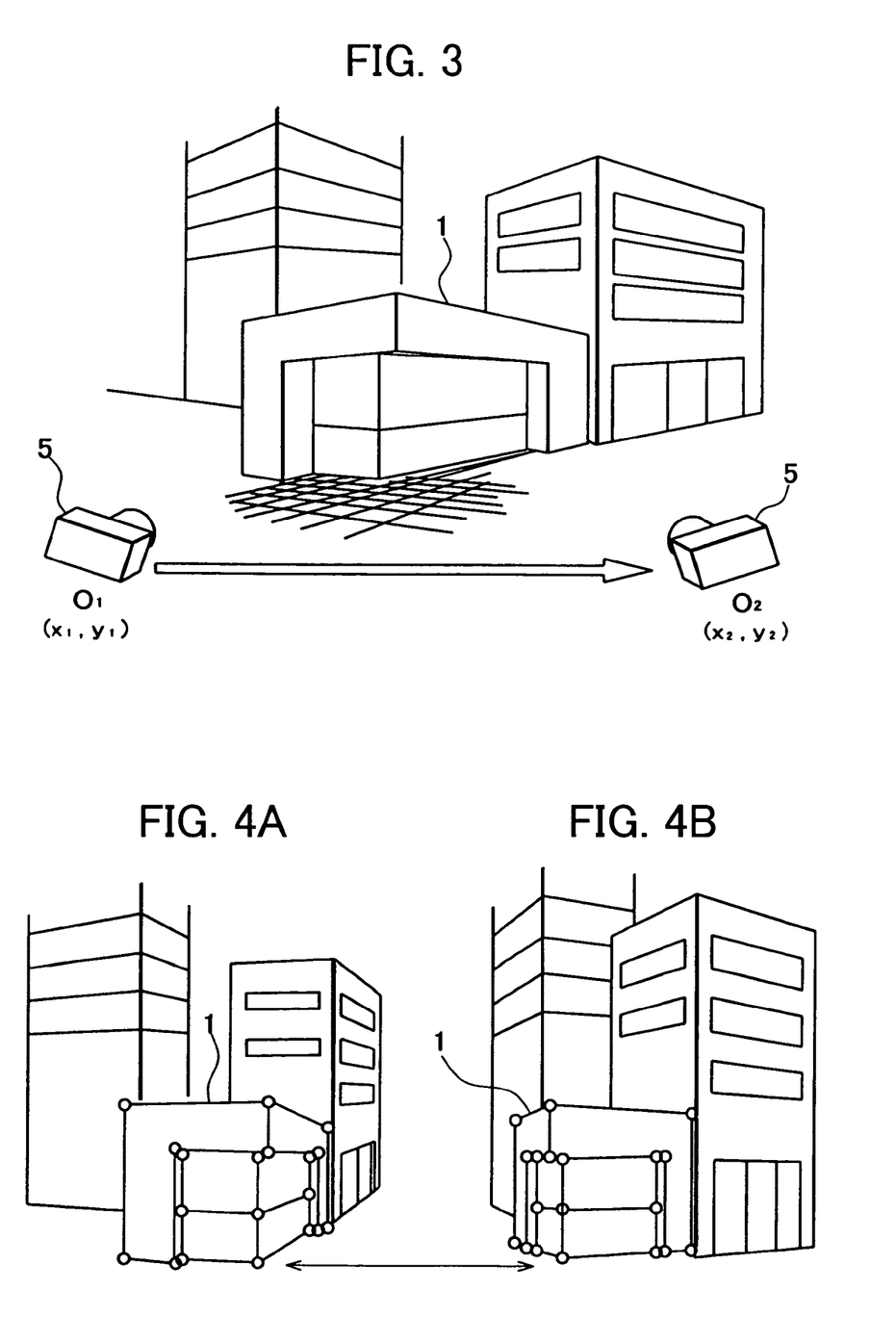
FIG. 3 is a perspective view to show how an image data is acquired.

As shown in FIG. 3, the image pickup device 5 is moved from a first position O1 (x1, y1) to a second position O2 (x2, y2), and an image is taken continuously on the object 1, for instance (Step 01). Or, an image is taken at a predetermined time interval. As the image-taking interval, image data for 24 frames are taken for one second or image data for 10 frames are taken for one second, for instance. It is selected adequately how many frames of the image data are taken for one second depending on magnification factor of the image or moving speed of the image-pickup device 5.

The image data of each frame is stored in the storage unit 8. At least for the image data at the first position and the image data at the second position, the positional data measured by the GPS unit 9 and the azimuth data measured by the azimuth sensor 11 are associated with the image data and are stored.

When the first image data is acquired, a required number of corner portions or cross points are extracted as characteristic points by the image processing program (the points marked with open circles in FIG. 4 (A)). The characteristic points thus extracted are set as pass points (Step 02). In an object such as building, because the corner portions are set as characteristic points, the characteristic points are a multiple of points distributed all over the screen. This contributes to the improvement of accuracy of relative orientation as described later.

Positions of the pass points thus set up on the image pickup element 6 are stored as a central position of retrieval. Then, for the subsequent image data acquired next over time, pass points are retrieved in the subsequent image data over the retrieval range, which is set up with the retrieval central position as the center. As described above, the image is taken continuously during movement, and the deviation of the preceding image data from the subsequent image data is only slight. Accordingly, the pass point exists within the retrieval range of the subsequent image data, and the pass point in the subsequent image data can be immediately identified. For the retrieval within the retrieval range, SSDA (Sequential Similarity Detection Algorithm) method or an area correlation method, etc. is used (Step 04).

Using the pass points identified in the subsequent image data as a central position of retrieval, the pass points of the preceding image data are checked by back-matching. If the pass point acquired by back-matching does not concur with the pass point obtained already, the pass point is deleted. By carrying out the back-matching, shadow (occlusion) or obstacle can be avoided. When the pass points of three or more image data have been obtained, the checking of coordinates is performed repeatedly by bundle adjustment calculation based on two or more images, and the pass points with lower accuracy are deleted. By deleting the pass points with lower accuracy, the accuracy for identifying the pass points is improved as a whole.

The preceding image data is compared with the subsequent image data, and the pass points as described above are retrieved sequentially on time series with respect to every frame image data(tracking of pass points). Finally, the pass points in the image data at the second position are retrieved and identified. Thus, the pass points identified in the first image data can be identified in the second image data (FIG. 4 (B)) (Step 05).

Relative orientation is performed from the pass points of the first image data and the pass points of the second image data, and tilting of the images and magnification factor of the images are calculated (Step 06).

Based on the tilting and the magnification factor thus calculated, deviation of the first image data from the second image data is corrected, and a stereo image is prepared, and matching (stereo-matching) of the two image data is carried out (Step 07).

By stereo-matching of the two image data, it is possible to acquire 3-dimensional data of the image coordinate system using one of optical axes of the images as a reference (Step 08).

Next, positional data obtained by the GPS unit 9 and the azimuth data obtained by the azimuth sensor 11 are added to the image coordinate system, and 3-dimensional data of the image coordinate system is converted to the data of ground coordinate system (Step 09).

By specifying an arbitrary point in the image, 3-dimensional data of the ground coordinate system can be promptly obtained (Step 10).

In 3-dimensional measurement based on the stereo image, positional relation of each individual point (i.e., each pixel on the image pickup element) which composes the image of the object to be measured can be obtained. The coordinate system (image coordinate system) can be formed, which uses one of optical axes of the first image and the second image as a reference. Based on this image coordinate system, 3-dimensional display can be achieved on a 2-dimensional display. Because the coordinate system can be easily converted, the image coordinate system can be converted to the ground coordinate system used in the surveying, for instance.

A place and an image-taking direction of stereo photographing are obtained by the GPS unit 9 and the azimuth sensor 11, and the image coordinate system is converted to the ground coordinate system based on the data. In case the object to be measured is a building, its position can be obtained. In case a reference point is on an image, the accuracy of 3-dimensional data obtained from the image can be increased by adding the information of the reference point, of which actual coordinates are already known.

It may be designed in such manner that a triangular indefinite net (TIN) is prepared based on 3-dimensional data of the image coordinate system (Step 08), and 3-dimensional data based on TIN may be acquired by processing such as texture mapping, etc. (Step 11-Step 13).

In the tracking of the pass points as described above, the initial image (the first image) and the final image (the second image) may be set up in high resolution, while the images in the middle of tracking may be set up in low resolution because the pass points are simply identified. As a result, image processing can be carried out at high speed, and the tracking of the pass points can be performed at high speed.

By performing bundle adjustment and stereo matching at the same time, the pass points can be detected in reliable manner.

The control arithmetic operation unit 7 may be designed as a separate system such as a personal computer, etc., and a memory card or an external storage unit may be used as the storage unit 8. The image data taken by the image pickup device 5 may be accumulated in the storage unit 8, and calculation may be made later by the control arithmetic operation unit 7.

Figure 6:
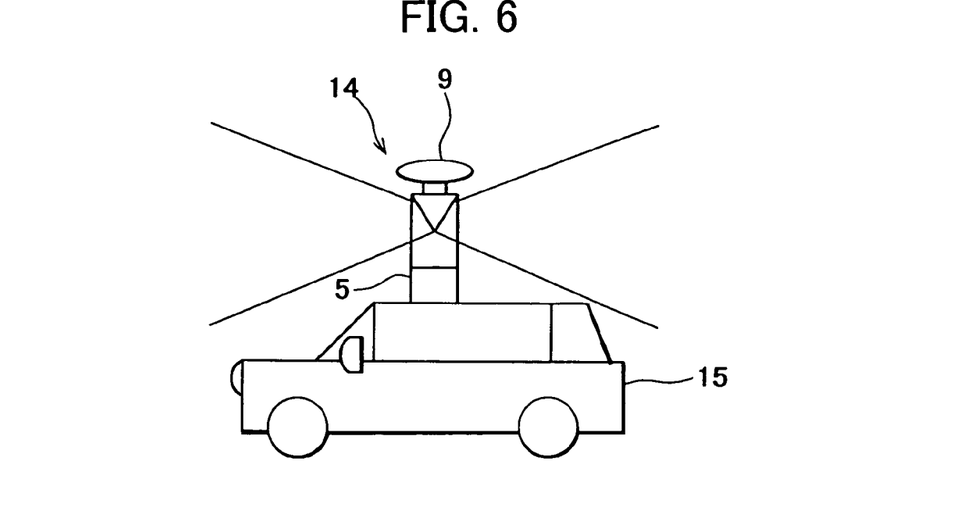
FIG. 6 is a schematical drawing of another embodiment of the present invention.
Figure 7:
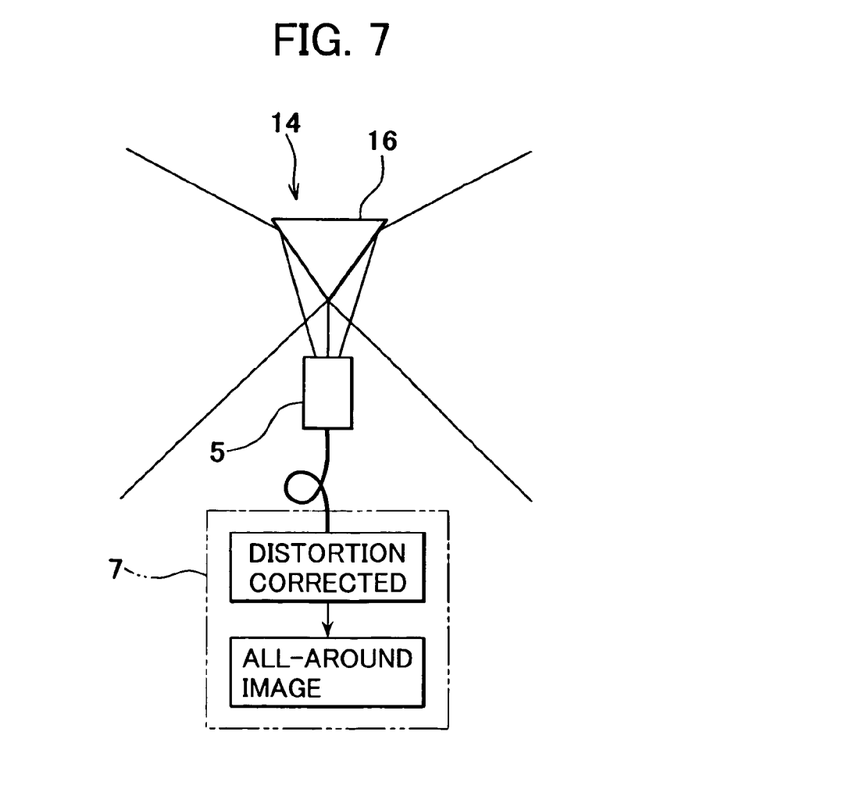
FIG. 7 is a schematical drawing of a corrected portion of an image in another embodiment of the present invention.

Now, description will be given on another embodiment and an application example referring to FIG. 6 and FIG. 7.

In another embodiment, a 3-dimensional data preparation system 14 is mounted on a mobile means which is movable such as an automobile 15. It is designed that the 3-dimensional data preparation system 14 and an object are moving relatively. Preferably, the 3-dimensional data preparation system 14 should be set to a position, such as a position on a roof, from where it is possible to have an extensive view of the surroundings.

The 3-dimensional data preparation system 14 has a conical mirror 16 with its centerline aligned with an optical axis of the image pickup device 5 so that an image can be taken via the conical mirror 16. Because the image is picked up via the conical mirror 16, an all-around image over the entire circumference can be picked up by the image pickup device 5. The image data is sent to the control arithmetic operation unit 7. The control arithmetic operation unit 7 comprises a distortion correcting program. Distortion in the image being sent is corrected, and the all-around image without distortion is stored in the storage unit 8 (FIG. 2).

When the all-around image is acquired, the processing such as the setting of the pass points in the first image to associate the first image with the second image and the tracking of the pass points from the first image to the second image, etc. is the same as in the embodiment described above. Images of a plurality of objects are taken in the all-around image. For the setting of the pass points, an adequate object in the all-around image is selected, and the setting is carried out.

As the 3-dimensional data preparation system 14, an image-taking system as commercially marketed for taking an all-around image can be used, for instance. The image-taking system comprises a CCD camera as the image pickup device 5. The image pickup device 5 (CCD camera) is placed under the conical mirror 16 in conical shape, and an image in the surrounding as reflected by the conical mirror 16 is taken. The position where the image is taken is obtained by the GPS unit 9, which is positioned above or at a known distance from the conical mirror 16. Moving direction can be obtained from the positional coordinates of two points as detected by the GPS unit 9.

The data of the image thus pickup and the data of the image-taking point are sent to a personal computer, for instance, and preparation of 3-dimensional data is performed.

By identifying the object to be measured as well as a first image-taking point and a second image-taking point, 3-dimensional data can be prepared by the same procedure as in the above embodiment. Based on the image coordinate data thus prepared and by adding the coordinates and direction of the image pickup device obtained by the GPS unit 9, the data is converted to the ground coordinate system.

What is claimed is:

1. A method for associating a stereo image, by acquiring images of an object from a first point and a second point and by associating the image at the first point and the image of the second point, comprising a step of moving from the first point to the second point while taking an image of the object with an image pickup device, a step of setting two or more pass points on the image of the first point, a step of setting a retrieval range with the pass point as a center, a step of comparing a preceding image and a subsequent image over time, a step of retrieving the pass points of the preceding image within said retrieval range and identifying the pass points of the preceding image in the subsequent image, a step of retrieving and identifying the pass points sequentially with respect to every frame image data from the image of the first point to the image of the second point, a step of identifying the pass points of the image of the second point, a step of performing a relative orientation of the image at the first point and the images at the second point based on the pass points of the image at the first point and the pass points of the image at the second point, and calculating a tilting of the images and a magnification factor of the images and a step of correcting a deviation of first image data from second image data based on the tilting and the magnification factor thus calculated.

2. A method for associating a stereo image, comprising a step of taking images of two or more objects moving relatively while moving, a step of identifying one of said images taken on the same object with an image pickup device as an image at a first point, a step of identifying an image taken by said image pickup device at a point separated from the first point due to moving as an image at a second point, a step of setting two or more pass points on the image at the first point, a step of setting a retrieval range with the pass point as a center, a step of comparing a preceding image and a subsequent image over time, a step of retrieving and identifying the pass points of the preceding image in the subsequent image with said retrieval range, a step of retrieving and identifying the pass points sequentially with respect to every frame image data from the image at the first point to the image at the second point, a step of identifying the pass points of the image at the second point, a step of performing a relative orientation of the image at the first point and the image at the second point based on the pass points of the image at the first point and the pass points of the image at the second point, and calculating a tilting of the images and a magnification factor of the images and a step of correcting a deviation of first image data from second image data based on the tilting and the magnification factor thus calculated.

3. A method for associating a stereo image according to claim 1 or 2, wherein images of the objects are continuously taken during movement.

4. A method for associating a stereo image according to claim 1 or 2, wherein images of the objects are taken at predetermined time interval during movement.

5. A method for associating a stereo image according to claim 1 or 2, wherein the image at the first point and the image at the second point are taken in high resolution, and images are taken in low resolution during the movement from the first point to the second point.

6. A method for associating a stereo image according to claim 1 or 2, further comprising a step of retrieving pass points of the preceding image based on the pass points of the subsequent image over time.

7. A 3-dimensional data preparation system, comprising an image pickup device for taking images of an object while moving from a first point to a second point, a GPS unit for detecting positional coordinates of said image pickup device, an azimuth sensor for detecting an image-taking direction of said image pickup device, and a control arithmetic operation unit for processing the images taken by said image pickup device, wherein said control arithmetic operation unit sets up two or more pass points on the image at the first point, sets a retrieval range with the pass point as a center, compares a preceding image and a subsequent image over time, retrieves and identifies the pass points of the preceding image in the subsequent image within said retrieval range, retrieves and identifies the pass points sequentially with respect to every frame image data from the image at the first point to the image at the second point, identifies the pass point of the image at the second point, performs a relative orientation of the image at the first point and the image at the second point based on the pass points of the image at the first point and the pass points of the image at the second point, calculates a tilting of the images and a magnification factor of the images and corrects a deviation of first image data from second image data based on the tilting and the magnification factor thus calculated and calculates 3-dimensional data of the object on a ground coordinate system based on data of coordinate position of said image pickup device detected by said GPS unit and based on data of image-taking direction of said image pickup device detected by said azimuth sensor.

8. A 3-dimensional data preparation system, comprising an image pickup device for taking images of two or more objects moving relatively while moving, a GPS unit for detecting position coordinates of said image pickup device, an azimuth sensor for detecting an image-taking direction of said image pickup device, and a control arithmetic operation unit for processing images taken by said image pickup device, wherein said control arithmetic operation unit defines one of the images taken on a same object as an image at a first point and defines an image at a point separate from the first point due to movement as an image at a second point, sets up two or more pass points on the image at the first point, sets a retrieval range with the pass point as a center, compares the preceding image with the subsequent image over time, retrieves and identifies the pass points of the preceding image in the subsequent image within said retrieval range, retrieves and identifies the pass points sequentially with respect to every frame image data from the image at the first point to the image at the second point, identifies the pass points of the image at the second point, performs a relative orientation of the image at the first point and the image at the second point based on the pass points of the image at the first point and the pass points of the image at the second point, calculates a tilting of the images and a magnification factor of the images and corrects a deviation of a first image data from second image data based on the tilting and the magnification factor thus calculated and calculates 3-dimensional data of the object on a ground coordinate system based on data of coordinate position of said image pickup device detected by said GPS unit and based on data of image-taking direction of said image pickup device detected by said azimuth sensor.

9. A 3-dimensional data preparation system according to claim 7 or 8, wherein said control arithmetic operation unit sets up a cross point obtained by edge processing of the image at the first point as a pass point.

10. A 3-dimensional data preparation system according to claim 7 or 8, wherein said image pickup device can take an all-around image of entire surroundings.

11. A 3-dimensional data preparation system according to claim 7 or 8, wherein images are taken in high resolution at the first point and at the second point, and images are taken in low resolution during movement.

12. A method for associating a stereo image according to claim 1 or 2, comprising a step of checking the pass points of the preceding image from the pass points obtained in the preceding image by back-matching and deleting the pass point obtained already if the pass points obtained by back-matching do not concur with the pass point obtained already.

13. A method for associating a stereo image according to claim 1 or 2, comprising a step of performing a checking of coordinates with respect to two or more images where the pass points can be obtained and deleting the pass points with low accuracy.

14. A 3-dimensional data preparation system according to claim 7 or 8, wherein said control arithmetic operation unit check the pass points of the preceding image from the pass points obtained in the preceding image by back-matching and deletes the pass point obtained already if the pass points obtained by back-matching do not concur with the pass point obtained already.

15. A 3-dimensional data preparation system according to claim 7 or 8, wherein said control arithmetic operation unit performs a checking of coordinates with respect to two or more images where the pass points can be obtained and deletes the pass points with low accuracy.

* * * * *